United States Patent [19]

Bredenkamp et al.

[11] Patent Number: 4,520,255

[45] Date of Patent: May 28, 1985

[54] HIGH FREQUENCY SELF-OSCILLATING WELDING APPARATUS

[75] Inventors: Gordon L. Bredenkamp, Roodepoort; Pierre Van Rhyn, Florida Park, both of South Africa

[73] Assignee: Crucible Societe Anonyme, Luxembourg, Luxembourg

[21] Appl. No.: 506,347

[22] Filed: Jun. 21, 1983

[30] Foreign Application Priority Data

Jun. 22, 1982 [ZA] South Africa ............... 82/4395

[51] Int. Cl.³ .............................................. B23K 9/10
[52] U.S. Cl. .................................. 219/130.1; 363/17; 363/98; 363/132
[58] Field of Search ............ 219/130.1, 130.32, 130.33, 219/137 PS; 363/17, 98, 132

[56] References Cited

U.S. PATENT DOCUMENTS

| | | |
|---|---|---|
| 3,211,953 | 10/1965 | Gibson et al. . |
| 3,231,711 | 1/1966 | Gibson et al. . |
| 3,304,485 | 2/1967 | Manz . |
| 3,518,401 | 6/1970 | Mathews . |
| 3,728,516 | 4/1973 | Daspit . |
| 3,818,177 | 6/1974 | Needham et al. . |
| 3,973,165 | 8/1976 | Hester . |
| 4,004,209 | 1/1977 | Lawson, Jr. . |
| 4,038,515 | 7/1977 | Risberg ........................ 219/130.5 |
| 4,048,468 | 9/1977 | Maule ............................. 219/130.1 |
| 4,117,303 | 9/1978 | Hedberg ........................ 219/130.1 |
| 4,159,409 | 6/1979 | Hedberg ........................ 219/130.21 |
| 4,201,906 | 5/1980 | Puschner ...................... 219/137 PS |
| 4,330,819 | 5/1982 | Foch et al. ......................... 363/132 |
| 4,346,332 | 8/1982 | Walden ................................. 363/98 |
| 4,410,935 | 10/1983 | Dang .................................. 363/98 |

FOREIGN PATENT DOCUMENTS

| | | |
|---|---|---|
| 2325793 | 12/1974 | Fed. Rep. of Germany . |
| 56-1270 | 1/1981 | Japan ............................. 219/130.1 |
| 722494 | 1/1955 | United Kingdom . |
| 1308695 | 2/1973 | United Kingdom . |
| 1362163 | 7/1974 | United Kingdom . |
| 1420319 | 1/1976 | United Kingdom . |
| 1431379 | 4/1976 | United Kingdom . |
| 1530906 | 11/1978 | United Kingdom . |
| 1541068 | 2/1979 | United Kingdom . |
| 2019135 | 10/1979 | United Kingdom . |
| 1570614 | 7/1980 | United Kingdom . |
| 2046537 | 11/1980 | United Kingdom . |
| 1591185 | 6/1981 | United Kingdom . |

Primary Examiner—Clifford C. Shaw
Attorney, Agent, or Firm—McGlew and Tuttle

[57] ABSTRACT

High frequency welding apparatus which includes a transformer and four transistor switches. The switches and the primary winding of the transformer are connected in a self oscillating or free running bridge configuration the operation of which is load dependent. Component damage due to overload conditions is thereby prevented and the voltage rating of the components may be equal to the voltage supplied to the bridge.

4 Claims, 1 Drawing Figure

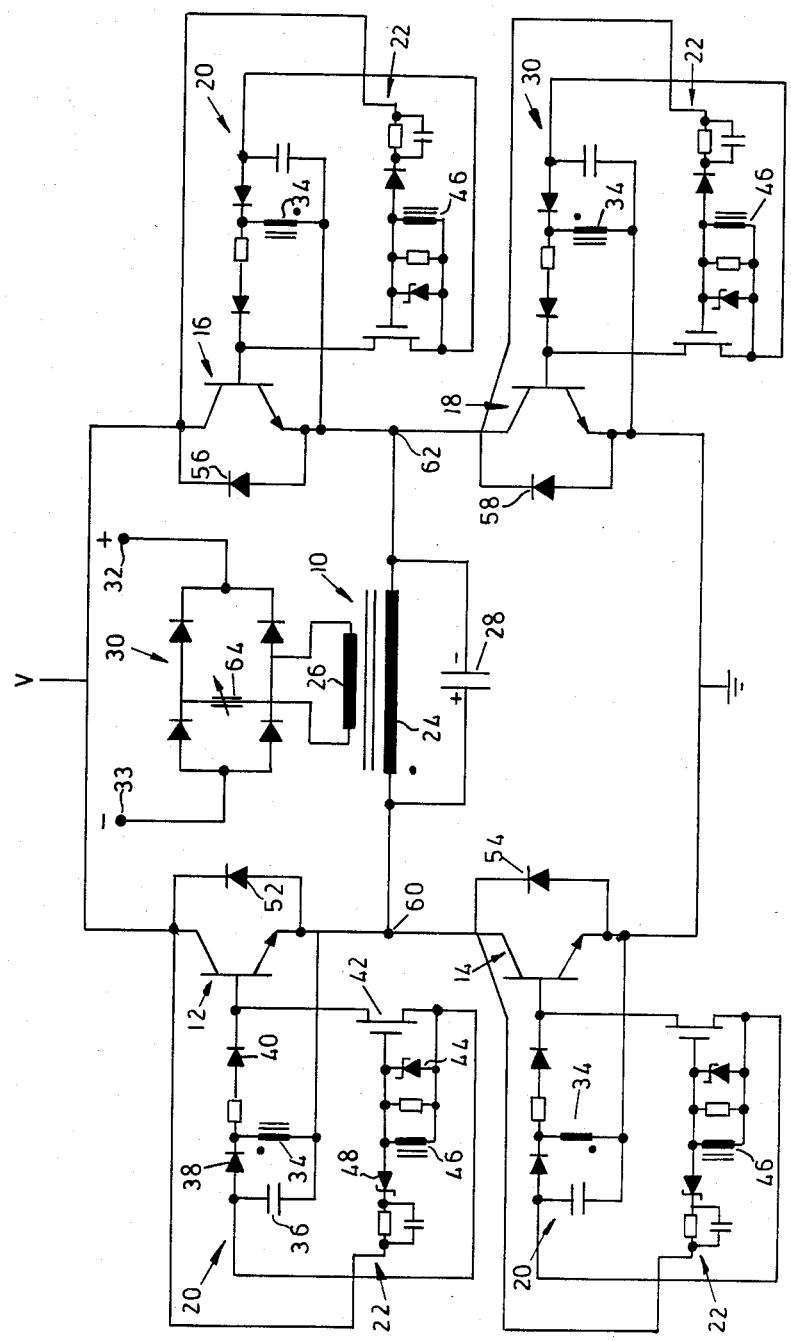

4,520,255

HIGH FREQUENCY SELF-OSCILLATING WELDING APPARATUS

BACKGROUND OF THE INVENTION

This invention relates to electrical welders.

It has been proposed by the applicant to construct welding apparatus which includes an inverter with an output frequency in excess of the audio range of frequencies, and a transformer, the transformer having a center-tapped primary winding connected to the inverter and a secondary winding with output terminals for electrical connection to an electrode and work to be welded.

This welder forms the subject of the applicant's South African Pat. No. 81/2611.

During operation of a welder of this kind the primary winding has impressed across it a voltage which is twice the supply voltage. If the supply voltage in turn is derived from a rectified three-phase alternating voltage of, say, 380, volts, then the primary winding has a voltage across it, during operation, of approximately 1000 volts. Transistorized switching devices capable of handling this voltage at the operating current are difficult to obtain and expensive.

The patent literature discloses a number of welding circuit arrangements. The patent specifications known to the applicant are those of U.K. Pat. Nos. 2046537, 2019135, 1591185, 1570614, 1541068, 1530906, 1431379, 1420319, 1362163, 1308695 and 722494, U.S. Pat. Nos. 4,201,906, 4,159,409, 4,117,303, 4,048,468, 4,047,096, 4,038,515, 4,004,209, 3,973,165, 3,818,177, 3,728,516, 3,518,401, 3,304,485, 3,231,711, 3,211,953; and German Pat. No. 2325793.

A large number of these circuits suffer from the disadvantages described.

The specification of U.K. Pat. No. 2046537 discloses a different approach in which use is made of two controlled bridge type thyristor based inverters, each connected to a primary winding, which are operated in parallel. The inverters do not display the voltage doubling effect. However, since the inverters are controlled they function, or are switched, at a rate which is load independent. This can be harmful to the components of the circuit and if an overload occurs the thyristors can be burnt out unless additional precautionary measures are taken.

SUMMARY OF THE INVENTION

It is an object of the present invention to provide welding apparatus which is capable of operating at frequencies in excess of the audio range of frequencies and wherein problems of the aforementioned type are minimized.

The invention provides welding apparatus which comprises first and second switching elements in series, third and fourth switching elements in series, the first and second switching elements, and the third and fourth switching elements, being respectively connected in parallel to a power supply, a transformer, the transformer having a primary winding, and a secondary winding from which welding current is drawn, the primary winding being connected between the connection points of the first and second switching elements, and the third and fourth switching elements, respectively, and self oscillatory switching means for alternately turning the first and fourth switching elements, and the second and third switching elements, on, thereby to cause current from the power supply to flow alternately in opposite directions through the primary winding.

The switching means controls the operating frequency of the transformer which preferably is in or above the audio range so that the core of the transformer can be of low mass.

The switching means is self oscillatory and therefore operates automatically, during operation of the welding apparatus, so that the circuit of the welding apparatus is essentially a free running bridge type with the operation of the circuit being determined by the load itself and consequently being self protecting. For example during overload or faulty conditions the circuit stops oscillating and damage to its components is thereby obviated.

The switching means may include first, second, third and fourth sensing means associated respectively with the first, second, third and fourth switching means, for sensing the voltage across at least part of each switching element, while it is on, and to initiate the switching off of the element if the voltage is above a predetermined level. The respective sensing means may simultaneously initiate switching off of the other switching element which is on.

The switching elements may be turned on by means which is coupled, preferably inductively, to the primary winding.

Each switching element may comprise one or more transistors.

The voltage sensing means referred to may include an electronic switch, preferably including a field effect transistor, for connecting the base of each transistor to a predetermined voltage.

The apparatus may include energy storage means, which preferably is constituted by a single capacitor, across the primary winding.

The output of the secondary winding of the transformer may be rectified to provide a d.c. welding supply.

The welding current may be controlled by means of a variable inductor in an output lead of the secondary winding.

BRIEF DESCRIPTION OF THE DRAWING

The invention is further described by way of example with reference to the accompanying drawing which is a circuit diagram of welding apparatus according to the invention.

DESCRIPTION OF PREFERRED EMBODIMENT

The drawing illustrates a welding transformer 10, four transistor switches 12, 14, 16 and 18 respectively, and bias circuits 20 and sensing circuits 22 for each of the transistor switches.

The welding transformer 10 includes a primary winding 24 and a secondary winding 26. The primary winding is shunted by means of a capacitor 28 and the secondary winding has connected to it, in bridge configuration, four rectifiers collectively designated 30. The bridge rectifiers have output terminals 32 and 33 respectively and these, in use, are connected to a welding electrode and to a work piece which is to be welded.

The bias circuits 20 are identical, as is the case with the sensing circuits 22. Thus the construction of only one bias circuit 20, and of only one sensing circuit 22, is hereinafter described.

A bias circuit 20 includes a winding 34 which is inductively coupled to the primary winding 24 of the welding transformer. The winding is shunted by means of a capacitor 36 and a diode 38 in series. The winding is connected by means of a diode 40 to the base of the associated transistor switch. It should be mentioned at this stage that in practice each transistor switch consists of a number of appropriate transistors connected in parallel but that for the sake of convenience each transistor switch is hereinafter referred to simply as a "transistor".

A sensing circuit 22 includes a field effect transistor 42 with a zener diode 44 and a winding 46 connected in parallel across the gate and the source of the transistor. The gate is connected via a second zener diode 48 through a R C network to the collector of the associated transistor switch.

The windings 34 of the bias circuits 20 associated with the transistors 12 and 18 respectively are coupled in one sense to the primary winding 24 while the windings 34 of the other two bias circuits which are associated with the transistors 14 and 16 respectively are coupled in a different sense to the primary winding. In addition the windings 46 of the sensing circuits 22 associated with the transistors 12 and 18 are inductively coupled to each other while the windings 46 of the sensing circuits associated with the transistors 14 and 16 are inductively coupled to each other.

Each of the transistors 12 to 18 is shunted across its collector and emitter by a free-wheeling diode 52 to 58 respectively.

The transistors 12 to 18, which are in a bridge configuration, are connected between earth and a supply voltage V which is derived for example from a rectified three-phase supply.

During the operation of the welding apparatus the transistor pairs 12 and 18, and 14 and 16, respectively, are alternately turned on so that the supply is connected in opposing polarities to the primary winding 24. The alternating magnetic flux induces a voltage in the secondary winding 26 and this is used to supply welding current to the welding electrode.

The operation of the circuit is as follows. The transistor pair 12 and 18 is initially turned on by means of a pulse applied, by means of a switch not shown, to the bases of the two transistors. Current then flows from the supply V through the transistor 12, the primary winding 24, and the transistor 18, to earth. Thereafter the transistors are turned on, heavily into saturation, by means of base current drawn from the windings 34 which are coupled to the primary winding 24.

Since the transistors 12 and 18 are hard on practically the full supply V is impressed across the primary winding 24 and the magnetic flux in the core of the transformer, which is a ferrite core, increases linearly. When the magnetic flux saturates the magnetizing current drawn by the primary winding increases rapidly until the total current drawn by the primary winding, which is the collector current passing through the two transistors 12 and 18, is equal to the prevailing product of current gain and base current. As the collector current tends to go above this value the two transistors tend to go out of saturation and power dissipation increases.

Since the transistors are moving out of saturation their collector to emitter voltages increase. The current gain factors of the transistors 12 and 18 are not identical and consequently one of the transistors reaches its maximum collector current before the other. Thus the collector to emitter voltage of the relevant transistor increases more rapidly than that of the other transistor. Assume for the sake of example that the transistor concerned is transistor 12. The collector to emitter voltage of this transistor is constantly monitored by means of the respective sensing circuit 22 and when it exceeds the zener voltage of the zener diode 48 the field effect transistor 42 is turned on and the base of the transistor is thereby connected to the capacitor 36 which is negatively charged via the diode 38. The charged base region of the transistor is thereby discharged and the transistor is turned off with a considerable reduction in collector current fall time.

While the transistor 18 is still on, the capacitor 28 starts discharging. The right hand side of the capacitor is clamped to earth via the transistor 18 and a circulating current is therefore established in the capacitor and the primary winding 24. There is no current flow from or to the source V. As the capacitor 28 starts changing polarity i.e. as its left hand side goes negative the diode 54 goes on provided the transistor 18 is still on. Current then flows through the transistor 18 to earth and from earth through the diode 54 to the capacitor. If on the other hand the transistor 18 has, in the meantime been turned off by the action of the respective cross coupled windings 46, then the potential across the two terminals of the capacitor 28 is floating. When the voltage across the capacitor 28 has completely reversed in polarity and exceeds the supply voltage V, the diodes 54 and 56 are simultaneously turned on and excess energy is returned to the supply from the transformer. After the stored magnetic energy has been returned to the supply the transistors 14 and 16 start conducting, being turned on by the voltage across the base windings 34. Current from the supply V therefore flows in the opposite direction through the primary winding 24 and, continuing in this way, the aforementioned process is repeated and an alternating magnetic flux field is established in the core of the transformer.

The voltage induced in the secondary winding 26 is rectified in the bridge rectifier 30 and supplied to the terminals 32 and 33 for welding purposes. The welding current which is drawn can be controlled by means of a variable inductor 64 which is connected in the output leads of the secondary winding.

The circuit configuration described is that of a self-oscillating bridge circuit. The four transistors are used to control the flow of current in opposing directions and alternately through the primary winding 24. The circuits 20 are used to turn the appropriate transistor pairs on. The circuits also provide an appropriate voltage to assist in turning the respective transistors off. The sensing circuits 22 are used to monitor the collector to emitter voltage of each transistor, and to turn the respective transistor pairs off when the collector to emitter voltage of one of the transistors reaches a predetermined value. The maximum rate of change of collector to emitter voltage of any transistor is controlled by means of the capacitor 28 which provides a path for the load current at the correct instant and ensures that the correct collector to emitter voltage changes at a controlled rate during switching. The self oscillating circuit is therefore load dependent. The design is such that in the event of an overload, or faulty operation, the oscillatory action is stopped, or at the very least varied to limit the current drawn from the circuit. This is a significant advantage for the components of the circuit are therefore fully protected.

In the configuration of the invention the full supply voltage is applied with opposing polarity alternately across the primary winding 24. There is therefore no voltage doubling effect and the transistors which are used as switching elements may therefore be chosen with a voltage rating equal to the supply voltage. The single capacitor 28 used for snubbing purposes is also substantially cheaper and far less complex than equivalent regenerative networks used for transistor protection, and is equally effective.

In a welder built in accordance with the principles of the invention the average output current was 200 amps continuously adjustable from 0 to 200 with a short circuit current of 300 amps. The open circuit voltage was 80 volts and the welder had a mass of 6 kgs. The welder operated from a 380 volts 50 Hz three-phase supply, or 220 volts 50 Hz single-phase supply, and its output frequency was from 15 to 20 KHz.

It should be pointed out that in as much as the circuit of the invention is self-oscillatory the exact operating frequency is determined by the operating conditions. However commencing with the core the design of the circuit is such that the operating frequency is sufficiently high to ensure a low mass core. On the other hand the frequency is not so high that electrical losses in the core become significant.

We claim:

1. Welding apparatus which comprises first and second switching elements in series, third and fourth switching elements in series, the first and second switching elements, and the third and fourth switching elements, being respectively connected in parallel to a power supply in a circuit for operating in a load dependent self-oscillatory manner under the full supply voltage without voltage doubling effect, a transformer, the transformer having a primary winding, and a secondary winding from which welding current is drawn, the primary winding being connected between the connection points of the first and second switching elements, and the third and fourth switching elements, respectively, and self-oscillatory switching means arranged in the circuit for operating in such load dependent manner and which includes means coupled to the primary winding for turning the switching elements on, and first, second, third and fourth sensing means associated respectively with the first, second, third and fourth switching elements, each sensing means sensig the voltage across at least part of the respective switching element while it is on, and including voltage regulator means and electronic switch means initiating the switching off of the said switching element if the voltage is above a predetermined level, whereby the first and fourth switching elements, and the second and third switching elements, are alternately turned on, thereby to cause current from the power supply to flow alternately in opposite directions through the primary winding without voltage doubling effect, and further including energy storage means which is connected across the primary winding and which establishes a circulating current in the primary winding and the energy storing means, and which thereafter returns energy to the power supply when the first and second switching elements, and the third and fourth switching elements, respectively, are turned off.

2. Apparatus of claim 1, wherein each switching element includes at least one switching element transistor, and each sensing means includes voltage regulator means and electronic switch means arranged such that, when the switching off of the respective switching element is initiated, the respective cooresponding electronic switch means operates to connect the base of such respective switching element transistor to a predetermined voltage.

3. Apparatus of claim 2, wherein each electronic switch means includes a field effect transistor coupled to the emitter of the corresponding switching element transistor and having a gate in series with a corresponding voltage regulator means coupled to the collector of said switching element transistor.

4. Welding apparatus according to claim 1 which includes means coupling the first and fourth sensing means, and means coupling the second and third sensing means, whereby when the switching off of one of the first and fourth switching elements is initiated the switching off of the other of the first and fourth switching elements is substantially simultaneously initiated, and when the switching off of one of the second and third switching elements is initiated the switching off of the other of the second and third switching elements is substantially simultaneously initiated.

* * * * *